Patented Aug. 26, 1930

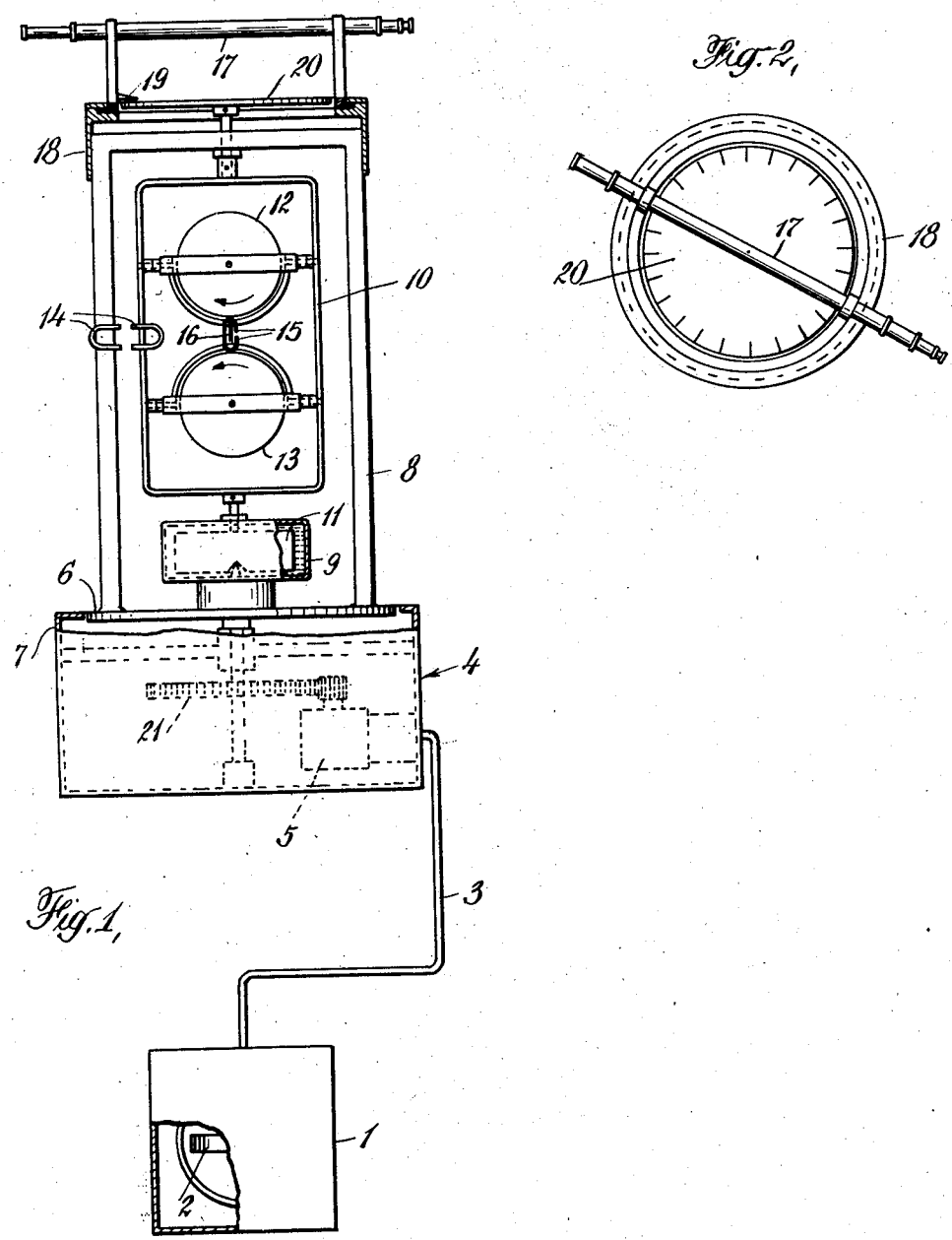

1,773,808

UNITED STATES PATENT OFFICE

ARTHUR PATTERSON DAVIS, OF NEW YORK, N. Y.

DIRECTION INDICATOR

Application filed December 7, 1922. Serial No. 605,533.

This invention relates to improvements in direction indicators especially adapted to be used on ships or moving vehicles in general. More particularly this invention relates to means whereby the direction indications of an ordinary compass may be reproduced in such a manner that the deflections of the compass indications are almost completely damped out. In other words, this invention relates particularly to means adapted to indicate a true direction irrespective of the deflections experienced by the primary direction indicator.

It is well known that the reading or indication of an ordinary gyroscopic compass does not at all times coincide with the meridian. When a compass of this type is in use it is subjected to various disturbing influences which produce deflections from the meridian. The manœuvering of the vessel, or other body on which the compass is mounted, changes of speed of the gyro wheels, and various other events have a material effect on the operation of the direction indicating apparatus.

The purpose for which the present invention was devised, is to provide a means which will reproduce the indications of a primary direction indicating device, such as a gyroscopic compass, in such a manner that the ordinary deflections of the primary indicating device are not indicated by the reproducing mechanism. To realize this purpose I prefer to employ a non-direction seeking unit in combination with the indicating or moving element of the primary indicator, the non-direction seeking unit being of such a character that it does not respond appreciably to the ordinary deflections of the primary indicator. Such a non-direction seeking unit may consist of a pair of identical gyroscopes pivoted in neutral equilibrium in a common frame and rotating in opposite directions. Such a unit is immune from the effects of the earth's rotation and all forces arising from the motion of the vessel. This unit is associated with the moving or indicating element of the primary indicator in such a manner that the primary indicator tends to transmit its motion to the unit by means of a suitable yielding connection.

By "non-direction seeking unit" I have reference to a device which does not have any inherent tendency to assume any particular direction by virtue of or in response to terrestrial forces, although capable of indicating directions.

The non-direction seeking unit is preferably so designed that it has a period of oscillation that is much greater than the average period of the deflections of the primary indicator. Thus the effect produced can be compared to the action of a short pendulum controlling a pendulum of practically infinite length. The period of oscillation of the non-direction seeking unit may be on the order of ten hours as compared with a period of 85 minutes for the primary indicator.

The present invention may take the form of a frame or similar element mounted on or controlled by the dial of a gyro compass repeater, the repeater being power driven from a suitable source. The non-direction seeking unit, comprising two gyroscopes pivoted in neutral equilibrium in a common frame, may be mounted on the frame which is supported by the repeater dial. A yielding connection, such as that provided by two permanent magnets may be provided between the gyro frame and the frame supported by the repeater dial. The two gyroscopes are preferably pivoted one above the other and are yieldingly constrained to return to a central position and to move in equal but opposite directions when deflected from this position. Any substantially permanent change in the position of the repeater dial produces a corresponding change in the position of the gyro frame, this change in the position of the gyro frame taking place very slowly as compared with the rate of change of the position of the dial. The cause of this slow movement of the gyro frame is that the gyros precess in response to the initial impulse supplied by the repeater dial, and thus resist the tendency of the gyro frame to turn. It is thus apparent that the ordinary deflections of the primary indicator will have little or no appreciable effect on the position of the gyro frame, which, therefore, serves to indicate the approximate average of the deflections of the primary indicator. In other words the gyro frame will not be appreciably deflected from the meridian by the ordinary deflections of the primary indicator.

This invention may be better understood by referring to the following detailed description which is to be considered in conjunction with the accompanying drawings in which:

Fig. 1 is an elevation partly in section of the improved direction indicating device, and Fig. 2 is a plan view of the device.

In the embodiment of the invention illustrated in the drawings the improved indicating device is shown as applied to a repeater compass of an ordinary gyro compass system. In the drawing 1 denotes the master gyro compass, the gyroscope being shown at 2. By means of suitable electrical connections 3, the master gyro compass controls the repeater designated generally by the character 4. The repeater compass contains a motor 5 driven by the master gyro compass 1 and is provided with a dial 6 arranged near the top of the repeater compass casing 7. The motor 5 transmits motion to the dial 6 by means of suitable gearing 21. The master gyro compass is preferably of the liquid suspension type, since this form of support is incapable of causing a permanent compass deflection.

As shown in Fig. 1, the repeater dial 6 carries a frame or substantially rigid element 8 which is therefore adapted to be deflected with the repeater dial 6. The repeater dial also carries the outer casing 9 of an anti-friction bearing 11. A gyro frame 10 is supported at one end by the frame 8 and at the other end by the anti-friction bearing 11. This gyro frame 10 carries two gyroscopes 12 and 13. These two gyroscopes are identical in construction and are pivoted in neutral equilibrium and are arranged to rotate in opposite directions. A yielding connection is provided between the frame 8 supported by the repeater dial 6 and the frame 10 carrying gyros 12 and 13. This yielding connection is shown in the form of two permanent magnets 14. This connection should be of such a character that relative azimuth movements of short duration are without appreciable effect on the reproducing mechanism, but a continuous deflection will in the course of a relatively long period cause the gyros frame to assume its normal position with respect to the repeater dial.

The two gyros 12 and 13 mounted one above the other are yieldingly constrained to return to a central position (as shown) and to move in equal but opposite directions when deflected from this position. The yielding connection employed between the gyros is shown in the form of two permanent magnets 15. The strength of the yielding connections may be so chosen that a compass oscillation of 85 min. period and amplitude of ±3 degrees has no visible effect on the azimuth of the averaging unit whose natural period may be about ten hours.

If it is found desirable to produce a damping effect of greater magnitude than that provided by the friction of the gyroscope bearings, a suitable damping means, such as the disc 16 may be provided. As shown in the drawings this disc is fastened to the gimbal frame of one gyro and one end thereof extends between the poles of the permanent magnet carried by the other gyro. The relative movement of the gyroscopes introduces eddy currents in the disc which tend to damp the motion of the gyroscopes. It is of course to be understood that any equivalent damping device may be employed.

The present invention is particularly adapted to be used on battleships where great accuracy is required of the direction indicating apparatus. While the ordinary gyroscopic compass, without auxiliary attachments, is suitable for general manœuvring of the vessel, yet such apparatus is not suited for the purpose of sighting objects or directing gun fire. In order that the present invention may be particularly useful for such purposes, which require very accurate direction indications, I prefer to provide a telescope directly associated with the direction indicating device. As shown in the drawings, such a telescope 17 is shown rotatably mounted on a support 18 carried by the frame 8. It is thus apparent that the support 18 is constrained to move with the repeater dial 6. The telescope mounting may be provided with a suitable pointer 19 adapted to cooperate with the dial 20 which is rigidly fixed to the gyro frame 10. It is thus apparent that, while the telescope is subject to the deflections of the repeater dial 6, yet at any time it may be accurately adjusted to any desired position by referring to the dial 20 which remains substantially fixed in space irrespective of the deflections of the repeater dial.

From the foregoing description it should be apparent that when a deflection of the repeater dial 6 occurs, the magnets 14 tend to produce a corresponding deflection of the gyro frame 10. The pull of the magnets 14 is counterbalanced however, by the action of the gyros 12 and 13 which precess in opposite directions and thus produce a force tending to resist the pull of the magnets. If the deflection of the repeater dial 6 is of long duration, the counterbalancing effect of the gyros 12 and 13 is gradually overcome, and the frame 10 then follows the repeater dial to some extent. Deflections of ordinary duration, however, have no appreciable effect on the position of the gyro frame 10 and therefore of the dial 20, due to the fact that these deflections are of such short duration that the repeater dial 6 returns to its initial position before the gyro frame 10 moves to any appreciable extent. It is thus apparent that I have produced a simple device whereby the direction indications of an ordinary compass, such as the repeater compass of the common gyro compass system, may be reproduced in a highly damped form, that is, the deflections of the repeater dial or primary indicator are almost completely damped out when they are reproduced by the improved indicating mechanism.

It is to be understood that the invention is not confined to the particular embodiment shown and described, but is intended to include such modifications thereof as fall within the scope of the appended claims.

It is of course obvious that the correction introduced by the non-seeking unit may be indicated by referring to a lubber line carried by the support 18.

I claim:

1. A device of the type described, the combination with a device capable of indicating direction and having a dial, of a frame fixed to said dial, a second indicating device journalled on the dial and on said frame, a yielding connection between said second device and said frame, said second device comprising two substantially identical gyroscopes pivoted in neutral equilibrium in a common frame, and a yielding connection between said gyroscopes tending to return them to a central position.

2. In a device of the type described, the combination with a device capable of indicating direction and having a dial, of a frame fixed to said dial, a second indicating device mounted in said frame and including a dial, a yielding connection between said second device and said frame permitting a relative movement between them in their common direction of rotation, and a device capable of being set in any azimuth direction, said last named device being mounted on said frame and adapted to be set with reference to the dial carried by said second indicating device.

In testimony whereof I affix my signature.

ARTHUR PATTERSON DAVIS.